United States Patent [19]
Woods
[11] Patent Number: 4,823,829
[45] Date of Patent: Apr. 25, 1989

[54] LIQUID METERING AND MIXING DEVICE

[76] Inventor: Percy Woods, 5554 Mabel Rd., Las Vegas, Nev. 89110

[21] Appl. No.: 138,877

[22] Filed: Dec. 29, 1987

[51] Int. Cl.[4] ........ F16K 19/00
[52] U.S. Cl. ........ 137/114; 137/264; 239/61; 239/200; 239/310
[58] Field of Search ........ 239/61, 200, 310, 318; 137/114, 264

[56] References Cited

U.S. PATENT DOCUMENTS

| | | | |
|---|---|---|---|
| 1,937,582 | 12/1933 | Murray | 137/114 |
| 1,937,893 | 12/1933 | Hutton | 137/114 |
| 2,062,704 | 12/1936 | Forsyth | 239/310 X |
| 4,075,928 | 2/1978 | Bitonti | 137/110 X |

*Primary Examiner*—Robert G. Nilson
*Attorney, Agent, or Firm*—Richard C. Litman

[57] ABSTRACT

A device for regulating and metering liquid fertilizer in an inner container that is housed within an outer shell or inner tank housing. Each of these containers or tanks have a common upper surface or wall that is essentially at ground level and has accessed, through a threaded cap, into the interior of the inner tank that holds a quantity of liquid, nitrogen based fertilizer. The outer shell or inner tank housing a means for entry of water, essentially on one side thereof and exit of water on the other. As water enters the pressure of the flow forces a switching mechanism to actuate, and that opens a valve on the bottom of the inner tank. Liquid fertilizer is displaced into the flow of water through the device by venturi action, and the fertilizer and water are mixed.

8 Claims, 3 Drawing Sheets

Fig. 1
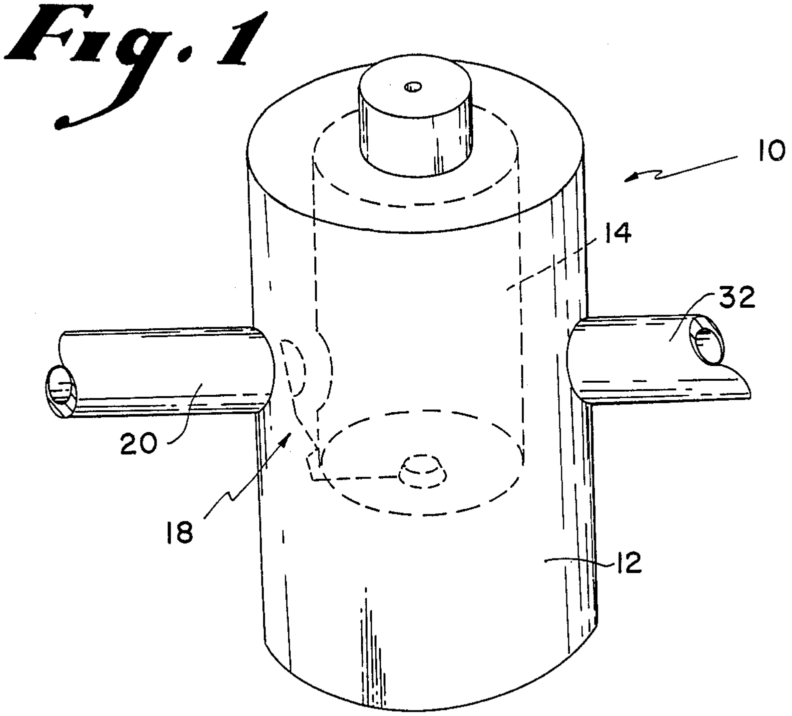
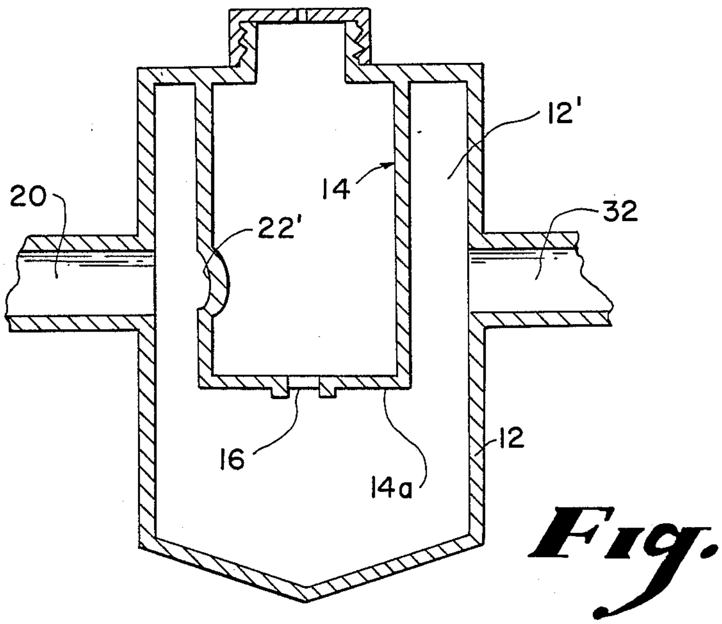
Fig. 2

LIQUID METERING AND MIXING DEVICE

FIELD OF INVENTION

The present invention relates to liquid injection systems for mixing two liquids, and more particularly to valving a nitrogen based liquid fertilizer into water for the subsequent watering and feeding of landscaped areas.

BACKGROUND OF THE INVENTION

Building and landscape architecture constantly undergoes evolutions of thought and style as new materials and designs are developed, tested, and introduced into common usage. Landscape architecture has undergone considerable change over the past fifty years, especially because of the differing climatic zones in the United States. Moreover, lawns today often have free-form, that has evolved as new theories of design have become accepted in the landscape industry.

Migration of people from the Eastern regions of the country to the West has resulted in a corresponding migration of some favorite turfgrass and plant species. Many different varieties of Kentucky bluegrass, for example, are now grown in areas of the country far removed from the more than twenty-five inches of annual preciptation needed to sustain these types of grasses. The use of various 'cool-season' turfgrass in relatively arid zones of the country has meant the emergence of an irrigation and maintenance industry to provide the expertise and systems needed to sustain these lawn and accessory plantings.

The present invention relates to such logistical support systems and especially to a means for selectively regulating the amount of nitrogen-based liquid fertilizer applied to different sections of the same landscape areas. To illustrate, a lawn area often moves in and out of shaded areas, created by trees, and around masses of shrubs. This freeform of design often places much of the turfgrass in the sun, and some in a combination of sun and shade.

These differing environmental factors contribute to slightly different amounts of fertilizer needed to sustain the lawn plantings, within respective micro-climates, in a healthy and vigorous condition. The present device relates to providing means for regulating the amounts of a liquid fertilizer applied through various laterals and junctions of an underground sprinkler system to effect the necessary appropriate application of fertilizer to the turfgrass areas.

DESCRIPTION OF THE PRIOR ART

The following U.S. Patents are found to be exemplary of the U.S. prior art. They are:

| U.S. Pat. No. | Inventor |
|---|---|
| 2,382,171 | Pommykala |
| 3,465,527 | Rohmer |
| 3,507,120 | Rohmer |

U.S. Pat. No. 2,832,171, issued to Pomykala, discloses a tank permanently placed underground for the purpose of storing highly inflammable liquids, such as gasoline.

U.S. Pat. No. 3,464,527, issued to R.H. Rohmer, discloses an underground container for liquids that is placed in a friction-free shaft for ease of relocation of the storage.

U.S. Pat. No. 3,507,120, to Rohmer, teaches a construction for a portable underground storage tank for liquids. This container is vertically installed in a 'dughole,' and readily removable.

These patents or known prior art uses teach and disclose various types of liquid metering and mixing devices of sorts and of various manufactures, and the like, as well as methods of their construction; but none of them, whether taken singly or in combination, disclose the specific details of the combination of the invention in such a way as to bear upon the claims of the present invention.

SUMMARY OF THE INVENTION

An object of the invention is to provide means for selectively fertilizing turfgrass and other ornamental plantings and further to alter the quantity of liquid fertilizer to be mixed with a given quantity of water.

A further object is to provide a means for centrally controlling, in an expeditious manner, the overall allocation of liquid fertilizer in a sprinkler or irrigation system.

Another object is to provide means for ready access to the device such that an operation may determine the amount of fluid in the system, and add an appropriate amount to the system.

These, together with other objects and advantages of the invention, reside in the details of the process and the operation thereof, as is more fully herinafter described and claimed. References are made to drawings forming a part hereof, wherein like numerals refer to like parts throughout.

DESCRIPTION OF THE DRAWING

FIG. 1 is a perspective view of the liquid mixing and metering device and illustrates the major elements of the invention by hidden line.

FIG. 2 is a vertical sectional view showing the cooperative arrangement of the various elements, specifically an inner tank deployed within a housing with the inner tank being disposed between a fluid inlet and a fluid outlet within the housing.

DESCRIPTION OF THE PREFERRED EMBODIMENT

Figure 3:
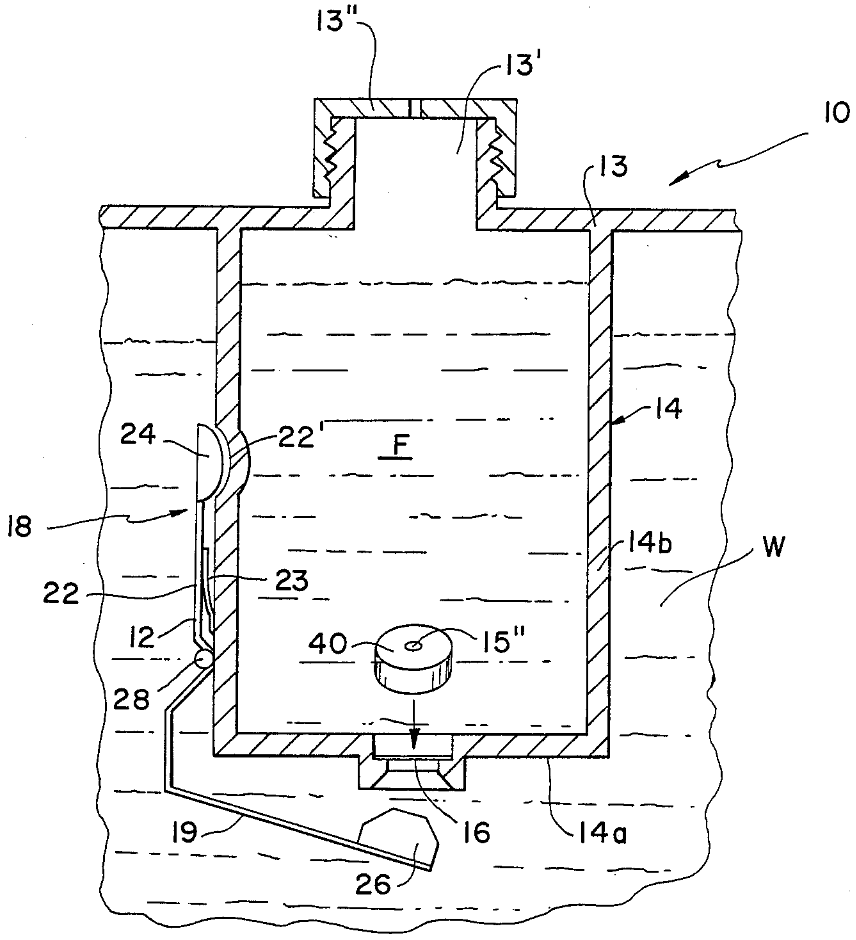
FIG. 3 is a vertical sectional view of an alternative embodiment illustrating a metering component working cooperatively with a valve and illustrates the displacement of the valve after fluid enters the inner tank housing.

Referring now to the drawings, in which like numerals refer to like elements throughout, the mixing and metering device 10 is seen to include an outer cylindrical tank housing 12 having a fluid or water mainline inlet conduit 20 connected thereto and within which is disposed an inner tank container 14. As water enters outer tank housing 12, it exerts pressure against switching means 22 such as a disc element 24, disposed in the path of the incoming water. As disc 24 is displaced, it is mated within an adjacent concaval area 22. The displacement actuates linkage 18, affixed to the disc 24 as is shown in FIG. 3 and which includes two arms 17, 19.

As water enters cavity 12, through a conduit juxtaposed said switch 22 it displaces the switch 22 or disc 24, urging it into recess 22 and pivots right angle linkage lever about hinging means 28 adjacent the lower circular corner 14' of the inner container 14 to downwardly displace a valve 26 from aperture 16 in said bottom wall 14a. As the water flow shuts off, leaf spring 23 urges the switch 22 out of recess 22 to its original position with a pivoting of valve 26 back into aperture 16, to close off the flow of liquid fertilizer that is contained within the inner cylindrical tank 14 with a bottom wall and a side wall meeting at a circular corner. The leaf spring 23, contiguous to said right angle lever at its vertical arm and contiguous to said side wall of said inner container, biases the right angle lever away from the side wall and toward the bottom of the inner tank.

The inner tank 14 positioned within the housing 12, includes a bottom 14a and side wall 14b and is positioned substantially concentrically therein. A common upper structural surface 13 defines the upper reaches of both outer tank 14 and the concentrically disposed inner tank housing 12. Inner tank 14 is disposed between inlet 20 and a fluid exit 32 in the housing 12 so as to define a chamber or cavity 17' through which water flows. As the water circulates peripherally around inner tank 14, valve 26 is actuated by the linkage 24 due to the substantially concurrent displacement of switching means 22 due to the fluid movement.

The movement of water peripherally around inner tank 14 functions to seat switching means 22 in the cavity 22 for the duration of water flow thereby sustaining valve 26 in the open position of FIG. 3.

Inner tank 16 has an orifice 16 disposed through the bottom 36 thereof and against which the valve 26 engages to close off passage of liquid fertilizer F from the tank 14 into the water W. When water flow passes or streams through the housing 12, the orifice 16 is opened, allowing a fluid or liquid stored within inner tank 14 to be drawn by lowering of pressure normal to flow by the venturi effect into the stream of water, mixing therewith prior to exit through the outlet 32.

A nozzle 40 may, alternatively, be inserted within opening 16 to regulate the amount of liquid fertilizer, or other fluid allowed to move through its orifice 15 in a given period of time. Such nozzle 40 includes a precisely machined orifice 15" and by changing or substituting nozzles with differing sizes or bores 15" the amount of liquid F contained in inner tank 14 will be drawn into the housing 12 at various flow rates determined by the size of nozzle orifice 15". A removable vented cap 13" on the upper surface 13 of the device allows access to the inner tank 14.

Figure 4:
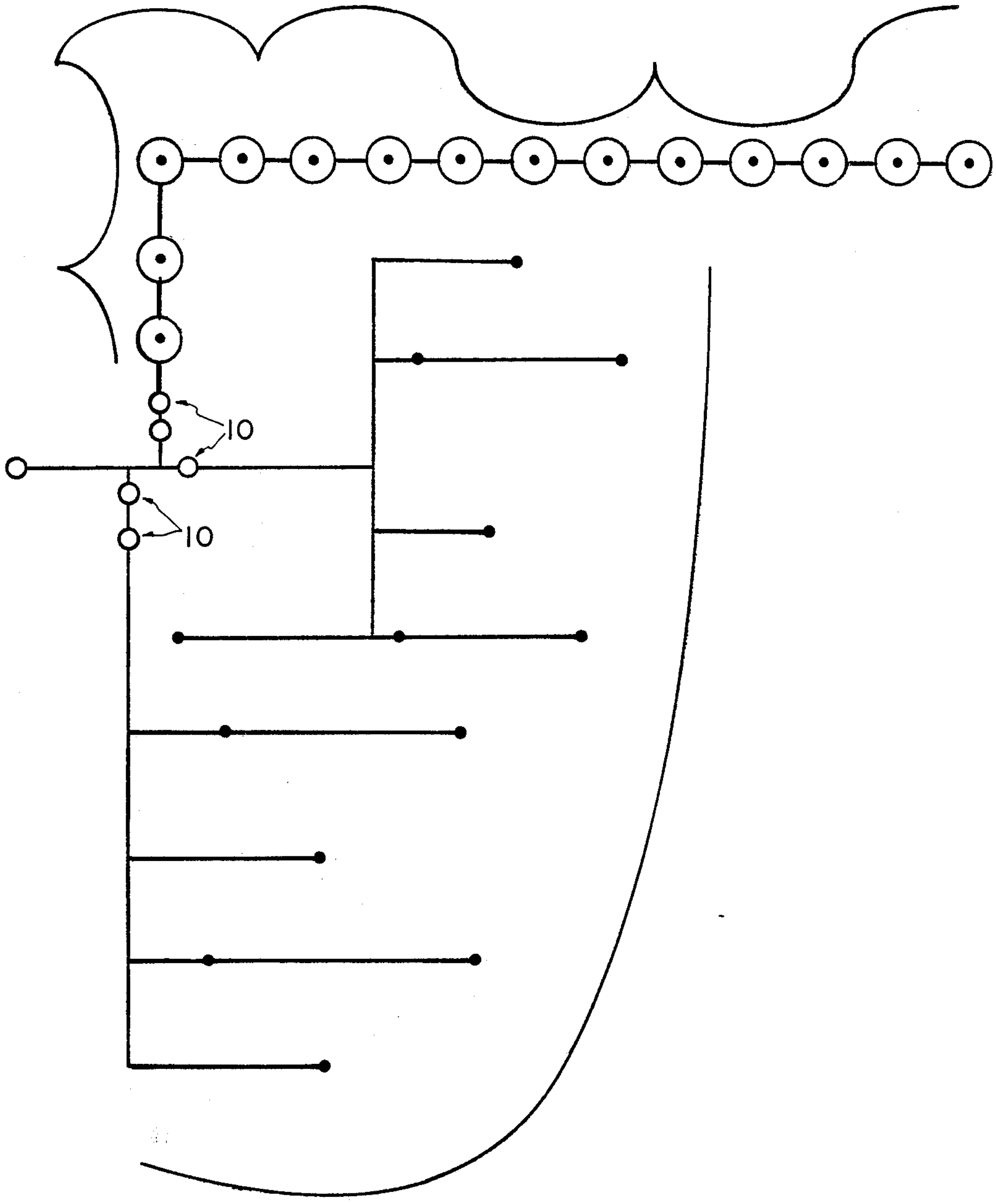
FIG. 4 is a diagrammatic view of a idealized irrigation or sprinkler system and illustrates a plurality of centrally located receptacle devices for the injection of fertilizer into the respective lines.

FIG. 4 illustrates the mixing and metering device 10 as included in an irrigation and sprinkler line, deployed at cluster points, or alternatively along a mainline where laterals branch off.

The foregoing is considered as illustrative only of the principles of the invention. Further, since numerous modifications and changes will readily occur to those skilled in the art, it is not desired to limit the invention to the exact construction and operates shown and described, and accordingly, all suitable modifications, and equivalents which may be resorted to, fall within the scope of the invention.

What is claimed is:

1. A fluid metering and mixing device, comprising:

an outer tank housing having means for ingress and means for exit of a fluid transversing therethrough;

said outer tank housing having deployed therein a cylindrical inner tank container adapted to hold a disparate fluid and having a bottom and a vertical side wall meeting at a circular lower corner, said outer tank housing surrounding and fully containing said inner tank container;

said inner tank container having switching means for valving a fluid therefrom, said switching means being deployed proximate to said ingress means of said outer tank housing, whereby fluid entering said outer tank housing abuts agianst said switching means with the fluid pressure thereof actuating said switching means;

said inner tank container bottom provided with an aperture;

valving means juxtaposed said inner tank container bottom aperture;

linking means connecting said switching means and valving means, a removable nozzle having a precisely machined orifice positioned within said aperture substantially proximate to said valving means;

said linking means comprising a lever including two arms disposed with a right angle at a pivot situated just below said lower corner of said inner tank container;

said means for ingress and means for exit including a pair of horizontal conduits entering said outer tank housing;

one of said lever arms extending upwardly to said switch means at a level juxtaposed said means for ingress;

the other of said lever arms extending to said valving means; and a leaf spring contiguous to said one arm and said side wall of said inner tank container slightly above said lower corner of said inner tank container and biasing said one of said arms away from the side wall;

whereby a venturi actuated fluid admixture is achieved within said outer tank housing with fluid being drawn through said nozzle orifice as said valving means is actuated.

2. A metering and mixing device as recited in claim 1 wherein said switching means comprises a disc configured to provide frontal area resistance to the passage of a fluid, the fluid biasing against said switching means to displace said switching means whereby said valving means are actuated.

3. A metering and mixing device as recited in claim 1 wherein said linkage means is a spring actuating member extending between said switching means and said valving means, said spring actuating member communicating a displacement or actuation of said switching means to said valve means as fluid urges against said switching means to displace and actuate said valving means.

4. A metering and mixing device as recited in claim 1 wherein said valving means is a displaceable stopper rigidly affixed to said spring actuating member whereby a fluid within said inner tank container is exposed to said venturi mixing action of said inner tank housing fluid as said stopper is displaced.

5. A metering and mixing device as recited in claim 1 wherein said inner tank container has a concaval recess to mate with a corresponding anterior surface of said switching means as said switching means is actuated by a passage of fluid whereby said switching means is stabilized mechanically within said inner tank container covcaval recess as said fluid flows through the device.

6. A metering and mixing device as recited in claim 1 wherein said inner tank container and said inner tank housing are substantially circular in cross-sectional configuration whereby said fluids are subjected to less frictional resistance as fluids transverse from said ingress means to said exit means of said device.

7. A metering and mixing device as recited in claim 1 wherein said inner tank aperture has inserted therein a nozzle element having an orifice, said orifice having a specific size diameter therewithin, whereby a fluid flow is governed through the device.

8. A metering device as recited in claim 7 wherein said nozzle element orifice is substituted whereby the flow rate of fluid through the device is altered.

* * * * *